UNITED STATES PATENT OFFICE.

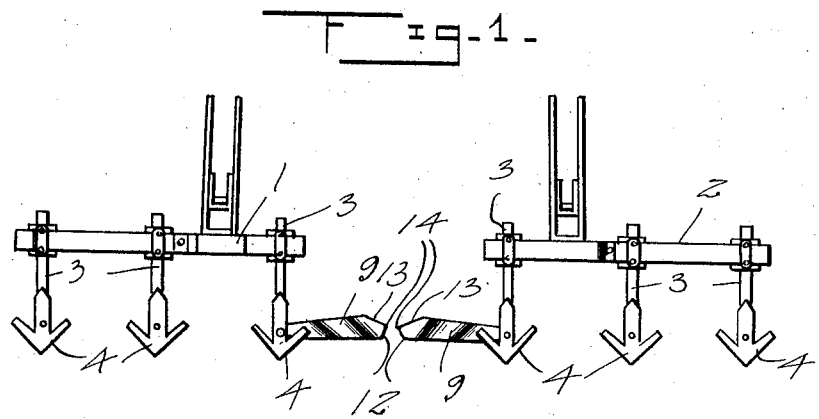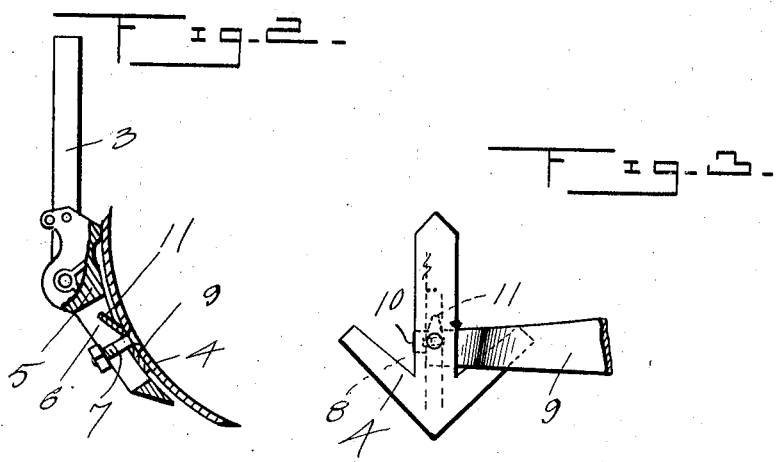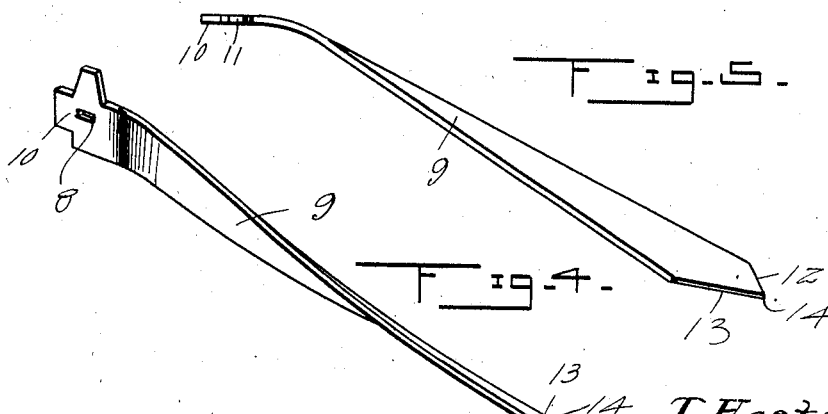

THOMAS HASTING, OF CRANFILLS GAP, TEXAS.

COTTON-CLEANING CULTIVATOR ATTACHMENT.

1,332,833.      Specification of Letters Patent.      Patented Mar. 2, 1920.

Application filed December 29, 1917. Serial No. 209,568.

*To all whom it may concern:*

Be it known that I, THOMAS HASTING, a citizen of the United States, residing at Cranfills Gap, in the county of Bosque and State of Texas, have invented certain new and useful Improvements in Cotton-Cleaning Cultivator Attachments; and I do hereby declare the following to be a full, clear, and exact description of the invention, such as will enable others skilled in the art to which it appertains to make and use the same.

This invention relates to an attachment for a cultivator which is designed for cleaning cotton or similar crops so as to eliminate the necessity of hoeing cotton and it comprises a pair of wing blades which are attached to the forward central shanks of a cultivator structure and extend inwardly toward each other and consequently toward a row of cotton, corn or the like, so that they will uproot grass, small weeds or the like close to the growing cotton and also level a ridge so that the cotton may be cultivated any desired number of times without forming the ridge along the row of plants.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a fragmentary view of an ordinary cultivator showing the improved attachment applied thereto.

Fig. 2 is a sectional view through the shank of a cultivator showing the manner of connecting one of the blades to the shank.

Fig. 3 is a face view of the lower portion of the shank showing a sweep blade applied thereto.

Fig. 4 is a perspective view of one of the cleaning blades, and

Fig. 5 is a top plan view of the blade.

Referring more particularly to the drawing, 1 and 2 indicate the beams of an ordinary cultivator structure which are arranged in the usual manner and have standards 3 carried thereby which support the sweep or cultivating shovels 4. The sweep or cultivating shovels 4 are of any ordinary construction, and they are connected to the lower ends of the standards or shanks 3 through the medium of the standard feet 5. The foot 5 is provided with the usual slot 6 which receives the bolt 7 that attaches the shovel or sweep to the foot as is ordinary in the construction of cultivators of this nature.

The cleaning blade is positioned between the inner surface of the blade 4 and the outer forward surface of the foot 5, as clearly shown in Fig. 2 of the drawings, and it is provided with a slot 8 which receives the bolt 7. The slot 8 is provided for permitting of limited adjustment of the blade 9 toward or away from a row of growing plants. A lug 10 extends longitudinally from the attaching end of the blade 9 and it is provided for strengthening the blade at this point to decrease the liability of breaking. A lug 11 is formed upon the blade 9 above the slot 8 and it provided for engagement in the slot 6 to prevent pivotal movement of the blade 9 independently of movement of the shank or standard 3 to which it is applied.

The blade 9 is slightly curved longitudinally, and also transversely as illustrated in Figs. 4 and 5 of the drawings, for positioning it to remove grass or small weeds from the furrow in which the plants being cultivated, are growing. The outer free ends of the blade 9 are cut angularly, as shown at 12 and 13, providing points 14 that are positioned upwardly from the lower edge of the blade. The portions 12 of the ends of the blade angle outwardly toward the cultivator shanks or standards 3 from the points 14 while the angled portions 13 angle in the opposite direction from the point 14 to the angling portions 12 and they also extend toward the shank as clearly shown in Fig. 1 of the drawings. This peculiar configuration of the ends of the blade permits of the removal of the weeds and grass close to the plants, without in any way causing injury to the plants.

As will be readily understood, the two sections of the cultivator are adapted to travel upon opposite sides of the row of plants being cultivated. The blades 9, which are secured to the innermost standards of the cultivator sections, due to their forward bend, project forwardly or in the direction of travel of the cultivator so as to form, in effect, a forwardly directed V-shaped deflecting frame the inner ends of the arms which are spaced apart so as to permit passage therethrough of the plants being cultivated, the arms or blades 9 of this frame serving to deflect the loosened soil and prevent forming of a ridge about the plants at opposite sides of the row. By providing the elongated slots 8 in the outer ends of these blades, the blades may be readily adjusted toward or away from each other so as to insure proper clearance of the plants while permitting the blades to work very closely to the sides of the row.

What is claimed is:

1. The combination with an agricultural implement including a shovel supporting foot having a slot formed therein, a shovel and a fastener for the shovel passing through the slot of the foot, of a scraping blade extending transversely of the foot for scraping engagement with the ground to one side of the shovel and having its inner end portion extended between the foot and shovel to bridge the slot of the foot and provided with an opening registering with the slot of the foot and having the shovel fastener passing through the opening to hold the scraper in place, and a tongue extending from the inner end portion of the scraper into the slot of the foot to hold the scraper against pivotal movement upon the fastener.

2. The combination with an agricultural implement including a shovel carrying foot, a shovel and a fastener connecting the shovel with the foot, of a scraper extending to one side of the shovel and having its inner end portion extending between the shovel and foot and provided with an opening through which the fastener passes to hold the scraper in place, and an extension formed upon the inner end portion of the scraper and engaging the foot to hold the scraper against pivotal movement upon the fastener.

3. A scraper for use in connection with an agricultural implement comprising an elongated body having a fastener receiving opening adjacent one end, the body being provided with an end extension constituting a bracing tongue, and a tongue extending transversely from one side edge of the body adjacent the inner end of the body for engaging the blade carrying shoe of an agricultural implement to retain the scraper against pivotal movement when in use.

4. A scraper for use in connection with an agricultural implement comprising a body provided with a fastener receiving opening adjacent one end, and a tongue extending from one side edge of the perforated end portion of the body serving as means to retain the body against pivotal movement when the scraper is in use.

In testimony whereof I affix my signature in presence of two witnesses.

THOMAS HASTING.

Witnesses:
J. L. WHITE,
G. LARSON.